United States Patent [19]

Dugge et al.

[11] 4,278,107
[45] Jul. 14, 1981

[54] AUTOMATIC VACUUM RELIEF VALVE FOR HOPPER CARS

[75] Inventors: Richard H. Dugge, St. Louis; Arnold Schlobohm, Ballwin, both of Mo.

[73] Assignee: ACF Industries, Inc., New York, N.Y.

[21] Appl. No.: 137,690

[22] Filed: Apr. 7, 1980

Related U.S. Application Data

[63] Continuation-in-part of Ser. No. 932,796, Aug. 11, 1978, abandoned.

[51] Int. Cl.³ .................... F16K 15/02; F16K 45/00
[52] U.S. Cl. ............................... 137/526; 137/588; 137/350
[58] Field of Search ............. 137/526, 587, 588, 589, 137/350

[56] References Cited

U.S. PATENT DOCUMENTS

| | | | |
|---|---|---|---|
| 1,578,766 | 3/1926 | Schwemlein | 137/587 X |
| 1,897,076 | 2/1933 | Shand | 137/587 X |
| 2,169,410 | 8/1939 | Drane | 137/526 X |
| 2,732,856 | 1/1956 | Jurs et al. | 137/526 |
| 3,260,224 | 7/1966 | Pettit et al. | 220/334 X |

Primary Examiner—William R. Cline
Attorney, Agent, or Firm—Henry W. Cummings

[57] ABSTRACT

An automatic vacuum relief valve assembly includes a cover plate closing an opening in a container to the atmosphere. A valve is vertically spaced below the cover plate and closes communication between the inside of the container and the outside atmosphere. A first passageway provides fluid communication between a first surface of the valve and the outside atmosphere. A second passageway provides fluid communication between the inside of the container and a second surface of the valve. When the pressure inside the container becomes less than atmospheric pressure, atmospheric pressure will cause the valve to move away from its seat and allow air to enter the container. When the pressure is equalized, the valve is biased to return to the seated position. The cross sectional area of the first passageways and the cross sectional area of the second passageways are at least equal to the cross sectional area of the valve to maximize the volume of air flow for a given cross sectional area of valve and pressure drop between the outside atmosphere and the inside of the container.

21 Claims, 5 Drawing Figures

U.S. Patent  Jul. 14, 1981  4,278,107
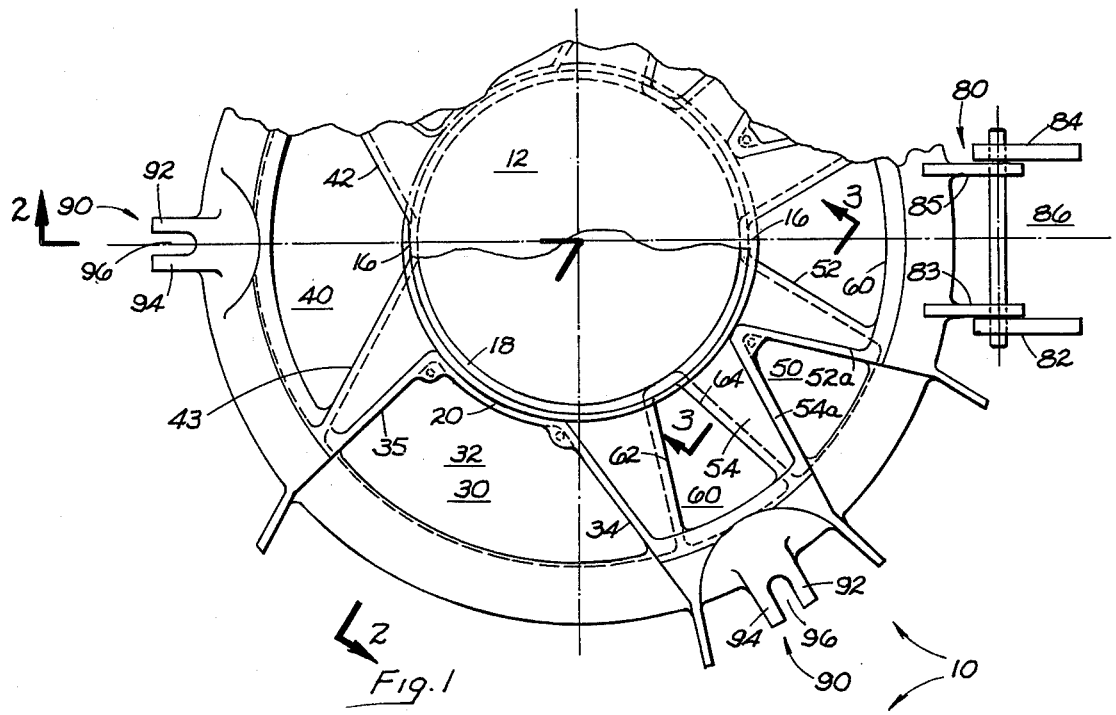
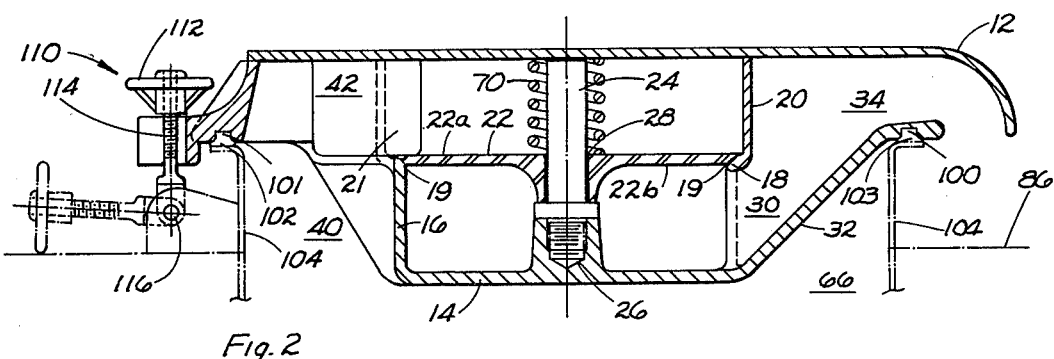
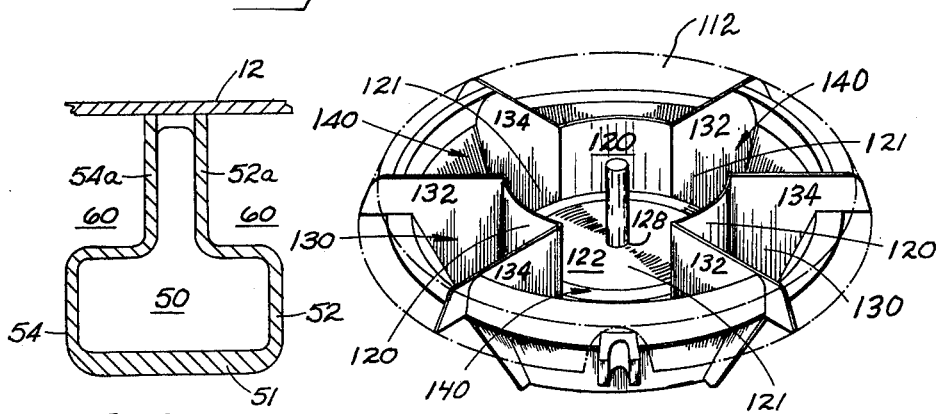

AUTOMATIC VACUUM RELIEF VALVE FOR HOPPER CARS

REFERENCE TO RELATED MATERIAL

This application is a continuation-in-part of Application Ser. No. 932,796, filed Aug. 11, 1978, now abandoned.

BACKGROUND OF THE INVENTION

It is presently required that an operator climb up on the roof of a hopper car to open a hatch before the car is unloaded. This is required to prevent a vacuum from developing in the car as the lading is withdrawn through an outlet in the bottom of the car. Occasionally an operator will forget to open a hatch before unloading a car and vacuum suction unloading equipment will cause severe structural damage to the car. Climbing on the car to open a hatch is an inconvenience to the operator and is dangerous in the winter months when the car's ladders and walkways are coated with snow and ice.

In U.S. Pat. No. 1,578,766 a vacuum relief valve is disclosed in which a valve member is vertically movable from a closed, seated position to an open, unseated position which provides fluid communication between first passageways extending from the outside atmosphere to the lower surface of the valve, and second passageways providing fluid communication between the interior of the tank and the upper surface of the valve member. When the pressure of the outside atmosphere exceeds the pressure in the tank the valve member is lifted to equalize the pressure. However, the cross sectional area of the first and second passageways are both smaller than the cross sectional area of the valve and not sufficiently large as to maximize the volume of air flow for a given pressure drop and valve cross sectional area.

U.S. Pat. Nos. 1,897,076 and 2,732,856 disclose vacuum valves in which the cross sectional area of first passageways in communication with the outside atmosphere is equal to the cross sectional area of the valve. However, the second passageways providing fluid communication between the valve and the container are laterally spaced from the valve. Thus a large cross sectional area is required to accommodate the valve and the second passageways. This would not be compatible with the limited clearance available on top of a railway freight car.

In U.S. Pat. No. 2,169,410, a combination pressure relief valve and vacuum relief valve is disclosed in which only a portion of the cross-sectional area of the pressure relief valve is used as a vacuum relief valve. Thus the volume of air flow into the container is not maximized for a given pressure drop and available valve area.

SUMMARY OF THE INVENTION

The object of the present invention is to provide a valve assembly which will open automatically when the pressure inside a container becomes less than atmospheric and which maximizes flow volume from a given size valve and pressure drop from the outside atmosphere into the tank.

An automatic vacuum relief valve assembly includes a cover plate closing an opening in a container to the atmosphere. A valve is vertically spaced below the cover plate and closes communication between the inside of the container and the outside atmosphere. A first passageway provides fluid communication between the inside of the container and a second surface of the valve. When the pressure inside the container becomes less than atmospheric pressure, atmospheric pressure will cause the valve to move away from its seat and allow air to enter the container. When the pressure is equalized, the valve is biased to return to the seated position. The valve may be biased to closed position by gravity or a spring.

Preferably, the valve is movable vertically and is gravity biased to closed position. The valve is preferably mounted upon a vertically extending guide with sufficient clearance to allow movement between open and closed positions. The first and second passageways are preferably circumferentially spaced and defined by vertically extending webs in a casting or fabrication.

The cross sectional area of the first passageways and the cross sectional area of the second passageways throughout each of their lengths are at least equal to the cross sectional area of the valve to maximize the volume of air flow for a given cross sectional area of valve and pressure drop between the outside atmosphere and the inside of the container.

THE DRAWINGS

FIG. 1 is a partial plan of the automatic vacuum relief valve of the present invention;

FIG. 2 is a sectional view looking in the direction of the arrows along the line 2—2 in FIG. 1;

FIG. 3 is a sectional view looking in the direction of the arrows along the line 3—3 in FIG. 1; and FIG. 4 is a schematic perspective view of another embodiment of the relief valve, not to scale, with the cover plate shown in phantom, illustrating the openings in the vertical webs.

FIG. 5 is a perspective of the vacuum relief valve of the embodiment shown in FIG. 4 with the valve and cover removed for clarity.

DESCRIPTION OF PREFERRED EMBODIMENTS

The vent of the present invention is indicated in the drawings generally at 10. The vent includes a cover plate 12 and a bottom plate 14 located below the top cover plate. A plurality of vertically extending bottom webs 16 extend upwardly from bottom 14. Webs 16 support a circular valve seat 18 having an opening 19. Top webs 20 depending from the top cover 12 also support valve seat 18. Openings 17 are located between webs 16 and openings 21 are located between webs 20.

A valve 22 is vertically movable about a pin 24 threaded into an opening 26 located in bottom 14. Valve 22 includes an opening 28, and sufficient clearance is provided between the valve and the pin 26 whereby the valve is movable vertically from a closed position shown in FIG. 2 upwardly from its valve seat up as far as the top cover plate 12.

A first air passage 30 is defined by bottom extension 32, vertical web 20, a vertical web 34, a vertical web 35 and cover 12. Bottom plate extension 32 is discontinuous about the periphery of bottom plate 14. A second air passage 40 is defined by a vertical web 16, vertical web 42, vertical web 43 and cover plate 12.

Another first air passage 50 is defined by bottom 51, webs 52 and 54 having reduced cross section portions 52a and 54a and cover 12. Similarly, another second air passage 60 is defined by bottom 61, cover 12 and webs 62 and 64. Similar passageways 30, 40, 50 and 60 are located in the other half of the vent.

It is apparent that second air passages 40 and 60 are in communication with the interior of container 66. The preferred container is a railway hopper car or tank car. However, it will be apparent to those skilled in the art that the automatic vent of the present invention is applicable to other transportation containers such as overland trucks and intermodal transit containers or stationary bins and silos. The pressure within the container 66 is transmitted through passageways 40, 60 and 21 to the upper surface 22a of the valve 22. Similarly first air passages 30 and 50 are in communication with atmospheric pressure and atmospheric pressure is thus transmitted to the lower surface 22b of valve 22.

It will thus be apparent that when the pressure within the container is below atmospheric, atmospheric pressure acting on the lower surface 22b of the valve will cause the valve to move vertically upwardly off its seat 18. When this occurs, atmospheric air will pass inwardly through openings 30, upwardly through opening 19 with valve 22 in open position, and then down into the container through passageways 21, 40 and 60. When the pressure within the container again becomes equal to atmospheric pressure, gravity will cause the valve 22 to return to the original seated position.

The cross sectional area throughout the first passageways, the cross sectional area throughout the second passageways, are at least equal to the cross sectional area of the valve to maximize the volume of air flow for a given cross sectional area of valve and pressure drop between the outside atmosphere and the inside of the container.

The pressure within the container may be lowered to below atmospheric in one of the following manners: If a discharge outlet is located at the bottom of the container and a vacuum suction system is connected to the outlet, the pressure within the container will be decreased by the vacuum suction unless a valve or a hatch in the container in communication with the atmosphere is opened. Furthermore, even if the container includes a gravity outlet in the bottom, and the car is unloaded by gravity, the material being unloaded occupies a given volume. When it is unloaded, air must be available to displace this volume. Otherwise the pressure in the container drops.

In a third example, the container is loaded with lading at a high temperature, for example, in the desert, having a temperature of 120° F., and then the container is moved to a low temperature area such as in the Rocky Mountains, having a temperature of 20° F. In accordance with the known equation PV=NRT, where P is pressure in the container, V is volume of the container, N is the number of moles of gas in the container, T is temperature in absolute temperature units, and R a constant, the pressure, P, in the container will decrease when the external temperature, T, decreases.

It will be apparent to those skilled in the art that in the situations described above where the pressure within the container acting on the upper surface 22a of the valve 22 is lower than the ambient pressure acting on the lower surface of the valve 22, the valve 22 will automatically open. Air will enter the container through the passageways 30, 50, 19 (with the valve 22 open) and flow down into the container through passageways 21, 40 and 60, and pressure equalization will occur. If desired, a spring 70 may be attached between valve 22 and top 12. The spring is preferably biased into the closed position at a pressure slightly above atmospheric to ensure that the valve 22 will not become cocked in the open position leaving the container continuously open to the atmosphere.

The vent of the present invention is particularly adapted to use in the roof of a railway hopper car, either in an existing hatch or in a separate hatch provided for this purpose, to avoid the need for the operator to climb on the car to open the hatch during unloading. Occasionally an operator will forget to do this, prior to unloading, resulting in damage to the car. Furthermore, there is a safety hazard when the operator is climbing on the car, particularly in winter when the roof and ladders are slippery. This arrangement allows adequate flow in the limited clearance available on the top of a rail car.

Furthermore, if desired, a vent of the present invention may be made a part of the hatch cover for a hopper car. In this event a hinge 80 is provided including a pair of vertical webs or brackets 82 and 84 which are welded to the car roof 86. A pin 88 passes through the brackets 82 and 84 and formed lugs 83 and 85 provided on the vent. Circumferentially spaced about the vent are closure members 90. The closure members 90 include a pair of vertical webs 92 and 94 which define a slot 96. A suitable latch or locking device 110 is mounted on the car including a wheel 112 threaded on a shaft 114 pivoted about a pin 116, as disclosed in U.S. Pat. No. 3,260,224, which is hereby incorporated into the present application by this reference. This latch is adapted to be slipped within opening 96 and fastened down to hold the vent cover in place.

A slot 100 is provided in bottom extension 32 and another slot 101 provided in top cover 12 to provide a seal extending continuously about the periphery thereof. Gaskets 102 and 103 inserted into these slots are held in place with a suitable known adhesive. In closed position the seals 102 and 103 engage a conventional hatch combing 104 of known construction.

The valve member 22 may be made of aluminum or plastic. The cover 12 may be made of metal or a plastic such as fiberglass reinforced polyester. The bottom 14 and the various ribs described above are preferably made of the same material as the top cover and are conveniently formed in a casting. However, the vent may also be assembled as a fabrication.

Another embodiment of the invention is shown in FIGS. 4 and 5. In this embodiment a top plate 112 shown in phantom in FIG. 4 and a bottom plate 114 shown in FIG. 5 are again provided. Vertical walls 116 again extend upwardly from bottom plate 114. Openings 117 are provided between the vertical walls to define passageways 130. Upper vertical walls 120 are provided and openings 121 are provided therebetween to define passageways 140. Vertical walls 132 and 134 are provided to separate passageways 130 from passageways 140. In addition, bottom plate 114 extends upwardly at 136 to aid in defining passageways 130. A valve member 122 is mounted about a vertically extending pin 124 with clearance at 128 to allow vertical movement of the valve. A spring (not shown) similar to spring 70 in FIG. 2 may be provided to bias the valve into the closed position. The valve rests upon a valve seat 118 defined by the upper surface of vertical walls 120 as described in regard to FIG. 2.

The total cross sectional area of the passageways 130 throughout their length is at least equal to the cross-sectional area of the valve (less the center portion for the shaft 124), and the total cross sectional area of the passageways 140 throughout their length is also at least equal to the cross sectional area of the valve member 122. Thus for a given cross sectional area of the valve 122 and the given pressure drop between the outside atmosphere and the pressure in the tank in communication with passageways 140, a maximum volume flow of air will occur from the outside atmosphere into the tank.

Closure assemblies 90 are also provided constructed in the same manner as closure members 90 in FIG. 1. They are adapted to receive a latch 110 as shown in FIG. 2.

A hinge 80 may also be provided as described in connection with FIG. 1.

The main difference between this embodiment and the embodiment shown in FIGS. 1–3 is that a molded assembly made of plastic is provided which is less expensive than the casting assembly illustrated in FIGS. 1–3.

What is claimed is:

1. An automatic vacuum relief valve assembly comprising: a top cover plate closing an opening in a container to the atmosphere; a vacuum relief valve mounted horizontally and spaced below said top cover plate; means biasing said valve into closed position engaging a valve seat located below said top cover plate and below said valve; said valve in said closed position closing communication between the inside of the container and the outside atmosphere, and in open position allowing communication between the container and the outside atmosphere; a plurality of first passageways providing fluid communication between the lower surface of the valve and the outside atmosphere; a plurality of second passageways spaced from said first passageways providing fluid communication between the inside of the container and the upper surface of said valve when said valve is in closed position; said first and second passageways being located below said top cover plate; the cross sectional area of said first passageways throughout their length being substantially at least equal to the cross sectional area of said valve and the cross sectional area of said second passageways through their length being at least equal to the cross sectional area of said valve; whereby when the pressure inside the container becomes less than atmospheric pressure, atmospheric pressure will cause the valve to move upwardly away from its seat and allow air to enter the container and whereby when the pressure in the atmosphere and in the tank are substantially equalized, the valve will return to the seated position; and whereby for a given available valve cross sectional area the volume of air flow into the container from the atmosphere is maximized for a given pressure drop from the atmosphere into the container.

2. An automatic vacuum relief valve assembly according to claim 1 wherein said first and second passageways are circumferentially spaced.

3. An automatic vacuum relief valve assembly according to claim 1 wherein said seat is defined by a top web depending from said top cover plate and a bottom web extending upwardly from a bottom plate.

4. An automatic vacuum relief valve assembly according to claim 3 wherein said bottom web includes openings which at least in part define said first passageways.

5. An automatic vacuum relief valve assembly according to claim 4 wherein said top web includes openings which at least in part define said second passageways.

6. An automatic vacuum relief valve assembly according to claim 1 wherein the valve is mounted for vertical movement and is gravity biased to closed position.

7. An automatic vacuum relief valve assembly according to claim 1 wherein the valve is biased into closed position by a spring located between said valve and said cover plate.

8. An automatic pressure relief valve assembly according to claim 1 wherein the valve is mounted upon a guide with sufficient clearance to allow movement between open and closed positions.

9. An automatic vacuum relief valve assembly according to claim 1 wherein said first and second passageways are circumferentially spaced and are at least partly defined by vertically extending webs.

10. An assembly according to claim 1 wherein the container is a railway freight car.

11. An assembly according to claim 10 wherein the container is a railway hopper car.

12. A combination automatic vacuum relief valve and hatch cover comprising: a top cover plate closing an opening in a container to the atmosphere; hinge means mounting said cover plate for pivotal movement between open and closed positions relative to said opening; latch means on said container for holding said top cover plate in said closed position; a horizontally extending valve vertically spaced below said top cover plate; means biasing said valve into closed position engaging a valve seat located below said top cover plate and below said valve, said valve in closed position closing communication between the inside of the container and the outside atmosphere; a plurality of first passageways providing fluid communication between a lower surface of the valve and the outside atmosphere; a plurality of second passageways spaced from said first passageways providing fluid communication between the inside of the container and the upper surface of said valve when said valve is in closed position; said first and second passageways located below said top cover plate; the total cross sectional area of said first passageways throughout their length being at least equal to the cross sectional area of said valve; and the total cross sectional area of said second passageways throughout their length being at least equal to the cross sectional area of said valve; whereby when the pressure inside the container becomes less than atmospheric pressure, atmospheric pressure will cause the valve to move upwardly away from its seat and allow air to enter the container; and whereby for a given available valve cross sectional area the volume of air flow into the container from the atmosphere is maximized for a given pressure drop from the atmosphere into the container; and whereby when the pressure in the atmosphere and in the container are substantially equalized, the valve returns to the seated position.

13. A combination automatic vacuum relief valve and hatch cover according to claim 12 wherein said first and second passageways are circumferentially spaced.

14. A combination automatic vacuum relief valve and hatch cover according to claim 12 wherein said seat is defined by a top web depending from said top cover plate and a bottom web extending upwardly from a bottom cover plate.

15. A combination automatic vacuum relief valve and hatch cover according to claim 14 wherein said bottom web includes openings which at least in part define said first passageways.

16. A combination automatic vacuum relief valve and hatch cover according to claim 15 wherein said top web includes openings which at least in part define said several passageways.

17. A combination vacuum relief valve and hatch cover according to claim 12 wherein the valve is mounted upon a vertically extending guide with sufficient clearance to allow movement between open and closed positions.

18. A combination vacuum relief valve and hatch cover according to claim 12 including a spring located between said valve and said cover biasing said valve into closed position.

19. A combination vacuum relief valve and hatch cover according to claim 12 wherein the first and second passageways are circumferentially spaced and defined by vertically extending webs.

20. A combination vacuum relief valve and hatch cover according to claim 12 wherein the container is a railway freight car.

21. A combination vacuum relief valve and hatch cover according to claim 20 wherein the railway car is a railway hopper car.

* * * * *